(12) United States Patent
Kobayashi et al.

(10) Patent No.: US 10,700,527 B2
(45) Date of Patent: Jun. 30, 2020

(54) POWER GENERATION SYSTEM, POWER CONDITIONER, POWER CONTROL DEVICE, POWER CONTROL METHOD, AND POWER CONTROL PROGRAM

(71) Applicant: SHARP KABUSHIKI KAISHA, Sakai (JP)

(72) Inventors: Ryuto Kobayashi, Sakai (JP); Kazuo Yamada, Sakai (JP); Hirosuke Miki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 148 days.

(21) Appl. No.: 16/087,605

(22) PCT Filed: Feb. 2, 2017

(86) PCT No.: PCT/JP2017/003856
§ 371 (c)(1),
(2) Date: Sep. 21, 2018

(87) PCT Pub. No.: WO2017/163625
PCT Pub. Date: Sep. 28, 2017

(65) Prior Publication Data
US 2019/0052090 A1  Feb. 14, 2019

(30) Foreign Application Priority Data
Mar. 25, 2016 (JP) .................. 2016-062765

(51) Int. Cl.
*H02J 3/38* (2006.01)
*H02J 7/35* (2006.01)
(Continued)

(52) U.S. Cl.
CPC ............... *H02J 3/383* (2013.01); *H02J 3/32* (2013.01); *H02J 3/38* (2013.01); *H02J 7/34* (2013.01);
(Continued)

(58) Field of Classification Search
CPC ...... H02J 3/383; H02J 3/32; H02J 3/38; H02J 3/14; H02J 7/34; H02J 9/061
(Continued)

(56) References Cited

U.S. PATENT DOCUMENTS 5,814,972 A * 9/1998 Shimada ................. H02J 9/061
320/132
7,898,219 B2 * 3/2011 Felps .................. H01M 10/425
320/134
(Continued)

FOREIGN PATENT DOCUMENTS

JP  2007-201257 A  8/2007
JP  2015-122841 A  7/2015

*Primary Examiner* — Alfonso Perez Borroto
(74) *Attorney, Agent, or Firm* — ScienBiziP, P.C.

(57) ABSTRACT

A power generation system and a power control device are provided that, even if there are provided a storage battery and a power conditioner as two independent devices, are capable of supplying electric power at least to the power conditioner in a power outage. The power generation system (1) includes the control device (41) connected to a second storage battery (42) so the that power conditioner (50) is fed with electric power by a power generation device (10), a commercial power grid (30) and a first storage battery (20).

13 Claims, 7 Drawing Sheets

(51) Int. Cl.
  *H02J 9/06* (2006.01)
  *H02J 7/34* (2006.01)
  *H02M 7/48* (2007.01)
  *H02J 3/32* (2006.01)
  *H02J 3/14* (2006.01)
  *H02M 3/156* (2006.01)

(52) U.S. Cl.
  CPC ............... *H02J 7/35* (2013.01); *H02J 9/06* (2013.01); *H02M 7/48* (2013.01); *H02J 3/14* (2013.01); *H02J 3/386* (2013.01); *H02J 3/387* (2013.01); *H02M 3/156* (2013.01); *Y02B 10/72* (2013.01)

(58) Field of Classification Search
  USPC ............................................................ 307/43
  See application file for complete search history.

(56) References Cited

U.S. PATENT DOCUMENTS

| | | | | |
|---|---|---|---|---|
| 8,441,152 B2* | 5/2013 | Tai | ............... | H02J 3/383 |
| | | | | 307/104 |
| 8,450,964 B2* | 5/2013 | Petroianu | ............... | H05B 47/00 |
| | | | | 320/101 |
| 8,578,184 B2* | 11/2013 | Nishimura | ............... | H02J 3/32 |
| | | | | 700/2 |
| 8,587,251 B2* | 11/2013 | Nakashima | ....... | H01L 31/02021 |
| | | | | 320/101 |
| 8,599,042 B2* | 12/2013 | Lee | ............... | G08G 1/095 |
| | | | | 340/907 |
| 8,749,934 B2* | 6/2014 | Hackenberg | ............... | H02J 1/10 |
| | | | | 136/244 |
| 8,786,139 B2* | 7/2014 | Cummings | ....... | H01L 31/02021 |
| | | | | 307/151 |
| 9,002,531 B2* | 4/2015 | Mansfield | ............... | H02J 3/32 |
| | | | | 700/291 |
| 9,219,374 B2* | 12/2015 | Washiro | ............... | H02J 7/007 |
| 9,356,456 B2* | 5/2016 | Fukada | ............... | H02J 7/0013 |
| 9,407,093 B2* | 8/2016 | Cummings | ............... | H02J 1/001 |
| 9,415,699 B2* | 8/2016 | Morioka | ............... | H02J 7/007 |
| 9,484,764 B2* | 11/2016 | Sameshima | ............... | H02J 7/0021 |
| 9,608,462 B2* | 3/2017 | Ishibashi | ............... | H02J 3/382 |
| 9,645,180 B1* | 5/2017 | Hoff | ............... | G01W 1/02 |
| 9,735,573 B2* | 8/2017 | Lindtjorn | ............... | H02H 7/268 |
| 9,876,389 B2* | 1/2018 | Ogawa | ............... | H02J 7/35 |
| 9,893,527 B2* | 2/2018 | Yamamoto | ............... | H02J 7/342 |
| 9,991,736 B2* | 6/2018 | Keuss | ............... | H02J 7/00 |
| 10,033,189 B2* | 7/2018 | Fujii | ............... | H02J 3/383 |
| 10,211,641 B2* | 2/2019 | Berger | ............... | H02J 7/35 |
| 10,236,703 B2* | 3/2019 | Chung | ............... | H02J 3/28 |
| 10,348,128 B2* | 7/2019 | Itaya | ............... | H02J 13/0017 |
| 10,381,863 B2* | 8/2019 | May | ............... | H02J 7/35 |
| 10,581,266 B2* | 3/2020 | Somani | ............... | H02J 3/38 |
| 2006/0133181 A1* | 6/2006 | Amano | ............... | G11C 5/141 |
| | | | | 365/229 |
| 2008/0315995 A1* | 12/2008 | Okuda | ............... | G06K 19/07749 |
| | | | | 340/10.1 |
| 2009/0302681 A1* | 12/2009 | Yamada | ............... | H02J 3/383 |
| | | | | 307/46 |
| 2009/0322484 A1* | 12/2009 | Toriyama | ............... | G06K 19/0724 |
| | | | | 340/10.1 |
| 2010/0225169 A1* | 9/2010 | Hanawa | ............... | H03K 17/302 |
| | | | | 307/43 |
| 2010/0225172 A1* | 9/2010 | Kozuma | ............... | H02J 50/10 |
| | | | | 307/104 |
| 2011/0156659 A1* | 6/2011 | Saeki | ............... | G03B 7/26 |
| | | | | 320/138 |
| 2012/0313438 A1* | 12/2012 | Klikic | ............... | H02J 9/062 |
| | | | | 307/66 |
| 2013/0030735 A1* | 1/2013 | Jau | ............... | G06F 11/24 |
| | | | | 702/63 |
| 2018/0198276 A1* | 7/2018 | Zubieta | ............... | H02J 7/0068 |
| 2018/0301906 A1* | 10/2018 | Qureshi | ............... | H02J 3/32 |
| 2019/0036332 A1* | 1/2019 | Kobayashi | ............... | H02J 1/08 |

* cited by examiner

| Grid Status | Operation Mode | Conditions | Switches | | | | | | | Power Conversion Direction |
|---|---|---|---|---|---|---|---|---|---|---|
| | | | First Storage Battery | | DC | | AC | | | |
| | | | 21 | 23 | 61 | 72/73 | 91 | 92 | 93 | |
| Normal | Joint Operation: Single-handed Operation | | Open | Open | Closed | Open | Closed | Closed | Open | DC → AC |
| | Joint Operation: Storage Battery Discharging | | Closed | | Open | Closed | | | | |
| | Joint Operation: Storage Battery Charging | | Open | Closed | Open | Closed | | | | DC ← AC |
| Malfunction (Power Outage) | Autonomous Operation: (1) Charge/discharge | Chargeable, Dischargeable | Closed | Closed | Closed | Closed | Open | Open | Closed | DC → AC |
| | Autonomous Operation: (2) Discharge | Dischargeable, Non-chargeable | | Open | | | | | | |
| | Autonomous Operation: (3) Power Supply Lost | Power Generation < Load, Low Remaining Charge | Open | Open | Closed | Open | Open | Open | Closed | Power Conversion Stopped |

| Grid Status | Operation Mode | Conditions | Switches | | | | | | Power Conversion Direction |
|---|---|---|---|---|---|---|---|---|---|
| | | | First Storage Battery | | | AC | | | |
| | | | 28 | 61 | 72/73 | 91 | 92 | 93 | |
| Malfunction (Power Outage) | Autonomous Operation: (4) Charge/discharge | Chargeable, Dischargeable | Closed | Closed | Closed | Open | Open | Closed | DC → AC |
| | Autonomous Operation: (5) Single-handed Operation | Non-chargeable | Open | | Open | | | | |
| | Autonomous Operation: (6) Power Supply Lost | Power Generation < Load, Low Remaining Charge | Open | Closed | Open | Open | Open | Closed | Power Conversion Stopped |

FIG. 9

POWER GENERATION SYSTEM, POWER CONDITIONER, POWER CONTROL DEVICE, POWER CONTROL METHOD, AND POWER CONTROL PROGRAM

TECHNICAL FIELD

The present invention relates in general to power generation systems including both a solar cell module and a storage battery module and in particular to power generation systems for use in a power outage and electric power control in such power generation systems.

BACKGROUND ART

Solar power generators are becoming popular. They convert solar power to electric power with solar cells and, for example, either supply the electric power to electric loads or export the electric power to a power grid. By DC-coupling the solar cells to a storage battery, the solar cells can charge the storage battery with high efficiency. This configuration eliminates the need for a DC/DC power converter for voltage conversion between the solar cells and the storage battery, and for this reason, provides an inexpensive power conditioner (see Patent Literature 1).

Patent Literature 2 discloses a system that includes a DC-coupled storage battery and solar cells so that the system can operate even during a power outage. Patent Literature 2 further discloses some operation examples of on/off switches for the solar cells and storage battery during a power outage.

CITATION LIST

Patent Literature

Patent Literature 1: Japanese Unexamined Patent Application Publication, Tokukai, No. 2007-201257 (Publication Date: Aug. 9, 2007)

Patent Literature 2: Japanese Unexamined Patent Application Publication, Tokukai, No. 2015-122841 (Publication Date: Jul. 2, 2015)

SUMMARY OF INVENTION

Technical Problem

The power storage system in accordance with the invention disclosed in Patent Literature 2, however, is designed so as to integrate the storage battery, an inverter, and a control unit into a single device. In addition, Patent Literature 2 does not clearly describe how the power storage system itself is powered. For these reasons, Patent Literature 2 falls short of delivering a solution to a power outage in a system in which a storage battery and a control unit are provided as two independent devices. Patent Literature 2 also fails to give a solution to a power outage in a system in which the storage battery is used also, for example, for peak shifting and peak clipping in a normal operation.

A storage battery and a power conditioner that includes an inverter, in large-scale systems as an example, come from different manufacturers. A control unit that sends instructions to both of them at suitable timings is also provided separately from them. In this configuration, the control unit, storage battery, and inverter constitute three distinct entities. For example, in a power outage at night when the solar cells are generating no electric power and the storage battery is not in operation (e.g., the switch for the storage battery is turned off in a peak shifting), something needs to be done to provide a power source for the control unit. As another example, if the storage battery is running low in a power outage, there is a need to properly shut down the entire system (e.g., to shut down the storage battery, inverter, and control unit in a proper sequence and to supply power to the control unit after the inverter is shut down) and start up the entire system on the following morning when the solar cells start generating electric power.

The present invention, in an aspect thereof, has been made in view of these issues, and it is an object of that aspect of the present invention to provide a power generation system that, even if there are provided a storage battery and a power conditioner as two independent devices, is capable of supplying electric power at least to the power conditioner in a power outage. It is also an object of the aspect of the present invention to provide electric power control technology for the system.

Solution to Problem

To address the issues, the present invention, in one aspect thereof, is directed to a power generation system to be connected to a power grid and an autonomous load system, the power generation system including: a power generation device; a first power storage device; a power conditioner; a second power storage device; and a control device, wherein: the power conditioner has a first AC power distribution path and a second AC power distribution path to which the commercial power grid and the autonomous load system are to be connected respectively; the power conditioner has a first DC power distribution path and a second DC power distribution path to which the power generation device and the first power storage device are connected respectively; the first DC power distribution path can be electrically connected to the second DC power distribution path; the second power storage device is to be connected to the autonomous load system; the control device is connected to the second power storage device; electric power can be supplied to the power conditioner from the power grid, the power generation device, and the first power storage device; and the control device can communicate with the first power storage device, the power conditioner, and the second power storage device.

To address the issues, the present invention, in another aspect thereof, is directed to a power control device for a power conditioner having a end where a power generation device and a first power storage device are connected in parallel and an AC end where a power grid and an autonomous load system are to be connected in parallel, wherein: the first power storage device is connected to the power conditioner via a power distribution path that includes a switching element; the autonomous load system includes a second power storage device that supplies electric power to the power control device; and the power control device, upon the power conditioner failing to receive any electric power at all from the power grid, the power generation device, and the first power storage device, causes the second power storage device to discharge and the switching element to close so that the first power storage device supplies electric power to the power conditioner.

Advantageous Effects of Invention

The present invention, in an aspect thereof, provides a power generation system and a power control device that, even if there are provided a storage battery and a power conditioner as two independent devices, are capable of supplying electric power at least to the power conditioner in a power outage.

DESCRIPTION OF EMBODIMENTS

The present invention, in an aspect thereof, provides among others a power generation system and a power control device that, even if there are provided a storage battery and a power conditioner as two independent devices, are capable of supplying electric power in an power outage unlike conventional examples. Specifically, if the power generation device is, for example, a solar cell array; the power generation device generates no electric power at all at night. If the first storage battery, which stores electric power supplied by the power generation device or the power grid, is not dischargeable at night, the power conditioner is fed with electric power by the power grid alone. When the power grid goes off in this situation, it would be convenient, for example, if a light connected to an autonomous load system can be used. Accordingly, in that aspect of the present invention, since neither the first storage battery nor the power grid supplies electric power to the power conditioner, there is provided a second storage battery that supplies electric power to the control device when the power grid goes off. The control device can hence cause the first storage battery to discharge and resume electric power supply to the power conditioner and also cause the first storage battery to discharge to the autonomous load system via the power conditioner.

The following will specifically describe embodiments of the present invention.

First Embodiment

Configuration of Power Generation System

Figure 1:
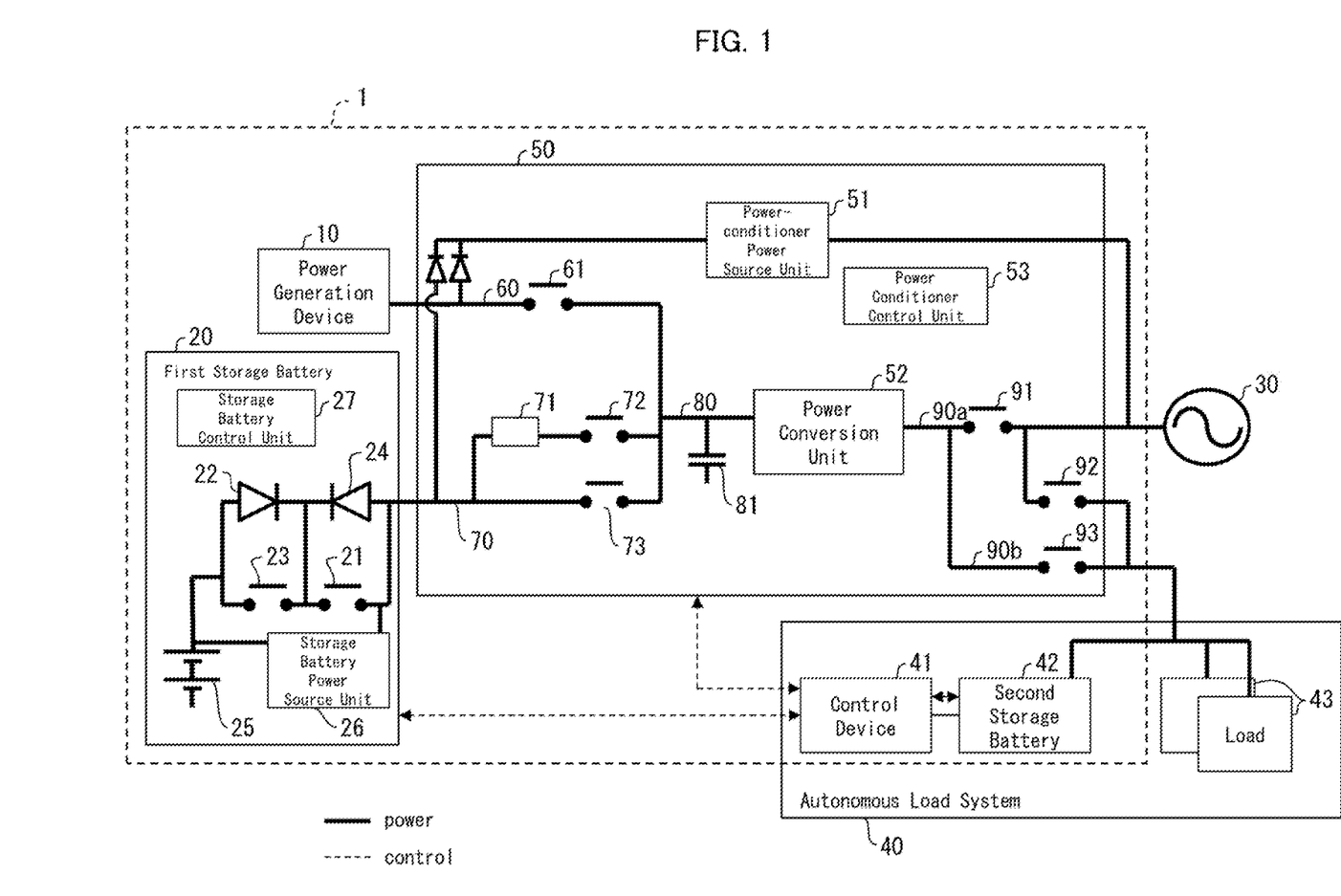
FIG. 1 is a block diagram of an example configuration of a power generation system in accordance with a first embodiment.

FIG. 1 is a block diagram of an example configuration of a power generation system 1 in accordance with a first embodiment. Referring to FIG. 1, the power generation system 1 includes a power generation device 10, a first storage battery 20 (first power storage device), a power conditioner 50, a control device 41, and a second storage battery 42 (second power storage device). The power generation system 1 is connected to an autonomous load system 40 and a commercial power grid 30 (power grid). The autonomous load system 40 is a load that can operate when the commercial power grid 30 is supplying electric power and also when the commercial power grid 30 is not supplying electric power (a power outage). FIG. 1 shows an example where the power conditioner 50 is connected to one autonomous load system 40. Alternatively, the power conditioner 50 may be connected to two or more parallel-connected autonomous load systems 40.

The power conditioner 50 has a DC end where the power generation device 10 and the first storage battery 20 are connected in parallel. More specifically, the power conditioner 50 includes: a power distribution path 60 (first DC power distribution path) connecting the power generation device 10 to the power conditioner 50; a switch 61 (third switching element) connecting the power distribution path 60 to a power distribution path 80; a power distribution path 70 (second DC power distribution path) connecting the first storage battery 20 to the power conditioner 50; and a switch 61 (fourth switching element) connecting the power distribution path 70 to the power distribution path 80. The power conditioner 50 may further include a series-connected resistor 71 and switch 72 in parallel with a switch 73 as a circuit that attenuates inrush current to the first storage battery 20 when the first storage battery 20 is connected to the power conditioner 50. The power conditioner 50 further includes: a capacitor 81 on the power distribution path 80; and a power conversion unit 52 that converts DC power (on the power distribution path 80) to AC power (on a power distribution path 90) and vice versa.

The power conditioner 50 has an AC end where the commercial power grid 30 and the autonomous load system 40 are connected in parallel. More specifically, the power conditioner 50 includes: a switch 91 (first switching element) connecting a power distribution path 90a (first AC power distribution path) to the commercial power grid 30; a switch 92 connecting the autonomous load system 40 to the commercial power grid 30; and a switch 93 (second switching element) connecting the autonomous load system 40 to a power distribution path 90b (second AC power distribution path) branching off the power distribution path 90a.

The power conditioner 50 may further include a power conditioner control unit 53 and a power-conditioner power source unit 51. The power conditioner control unit 53, for example, controls the switches 61, 72, 73, and 91 to 93 to open/close and measures and manages various information about the power conditioner 50 (e.g., its electric energy, current, voltage, and temperature). The power-conditioner power source unit 51 supplies electric power to the power conditioner control unit 53 and various switches. The power-conditioner power source unit 51 may source electric power from any of the power generation device 10, the first storage battery 20, and the commercial power grid 30, depending on various factors involved. FIG. 1 shows that the power-conditioner power source unit 51 sources electric power from the power generation device 10 via the power distribution path 60. Alternatively, the power-conditioner power source unit 51 may source electric power from the power generation device 10 via the power distribution path 80.

The power generation system 1 is, for example, an electric power control system connected electrically to the commercial power grid 30 and the autonomous load system 40 via the DC power distribution path 80. The power generation device 10 and the first storage battery 20 are capable of operating jointly with the commercial power grid 30. The power generation system 1 allows the electric power generated by the power generation device 10 to be exported (outputted) to the commercial power grid 30, in order to sell the electric power to an electric power company. The autonomous load system 40 is connected to the second storage battery 42 and the control device 41, as well as to a load 43. The second storage battery 42 and the control device 41 are included in the power generation system 1.

The power generation device 10 may have any structure, including an array of solar cells, a fuel cell, a secondary battery, and/or a wind power generator, or any combination of them. FIG. 1 shows only one power generation device 10, which is a mere example. Alternatively, there may be provided two or more power generation devices 10. The power generation device 10 generates DC power for output to the power distribution path 80.

The first storage battery 20 may include: a charge switch 23 and a charge diode 24 both for charging a storage battery module 25; a discharge switch 21 and a discharge diode 22 both for discharging the storage battery module 25; a storage battery power source unit 26; and a storage battery control unit 27, The storage battery power source unit 26 supplies electric power, for example, to the storage battery control unit 27 and various switches. The storage battery control unit 27, for example, controls the switches 21 and 23 to open/close and measures and manages various information about the first storage battery 20 (e.g., its electric power, current, voltage, and temperature). In this example, the charge switch 23 is closed to charge the storage battery module 25, the discharge switch 21 is closed to discharge the storage battery module 25, and both of these switches are closed to charge and discharge the storage battery module 25.

Charging/Discharging of First Storage Battery

To charge, discharge, or charge/discharge the first storage battery 20, the switches 72 and 73 also need to be closed. The first storage battery 20 may be charged with electric power from either one of the power generation device 10 and the commercial power grid 30. The first storage battery 20 discharges to either the commercial power grid 30 or the load 43.

The first storage battery 20 may be a high-capacity storage battery (e.g., at least a few tens of kilowatts) so that the second storage battery 42 can provide a power source for the control device 41 for at least a few minutes in the case of a power outage.

The voltages on the power distribution paths 60 and 70 generally differ, for example, when the switches 61, 72, and 73 are open. If the charge switch 23 is closed, and the voltage on the power distribution path 60 (the output voltage of the power generation device 10) is greater than the voltage on the power distribution path 70 (the output voltage of the first storage battery 20), an inrush current may flow to the first storage battery 20, potentially destructing the first storage battery 20, unless the switches 61, 72, and 73 are closed in a correct sequence.

As a suitable example, the switches 21, 23, 61, 72, and 73 are initially opened. Next, the charge switch 23 is closed, after which the switch 72 is closed. Then, a current flows through the resistor 71 and to the capacitor 81, rendering the voltage on the power distribution path 80 equal to the voltage on the power distribution path 70 (the output voltage of the first storage battery 20) (precharging). Then, the switch 73 is closed, thereby connecting the power distribution path 70 to the power distribution path 80. Next, the switch 61 is closed. Due to a voltage difference between the power generation device 10 and the first storage battery 20, the closure of the switch 61 results in an inrush current which is absorbed by the capacitor 81. The switches 72 and 73, as an example, may be operated by the power conditioner control unit 53.

Operation of Power Generation System

The power generation system 1 outputs electric power to the commercial power grid 30 or receives electric power from the commercial power grid 30 while the commercial power grid 30 is functioning normally (e.g., not in a power outage). At the same time, the power generation system 1 supplies electric power to the autonomous load system 40. To achieve this, for example, the power conditioner control unit 53 closes the switches 91 and 92 and opens the switch 93.

When there occurs a malfunction in the commercial power grid 30 (e.g., in a power outage), the power generation system 1 is disconnected from the commercial power grid 30 so that the power generation system 1 can supply electric power to the autonomous load system 40 alone. To achieve this, for example, the power conditioner control unit 53 opens the switches 91 and 92 and closes the switch 93.

Figure 2:
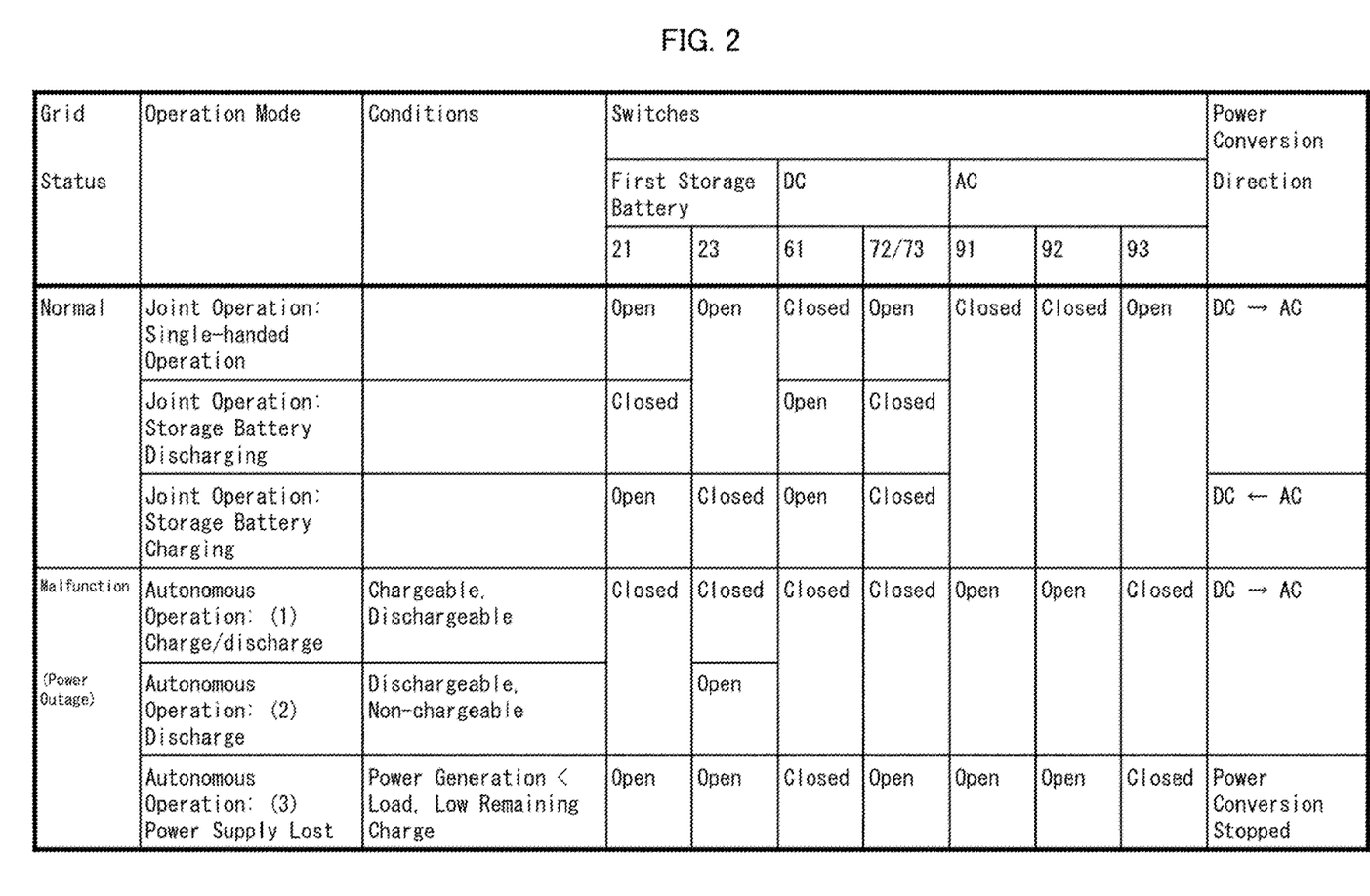
FIG. 2 is a diagram showing, collectively in tabular form, example relationships between the status of a commercial power grid, conditions, the open/close state of each switch, and power conversion directions in various operation modes of the power generation system.

FIG. 2 is a summary table of example relationships between the status of the commercial power grid 30, conditions, the open/close state of each switch, and the power conversion direction of the power conversion unit 52 in various operation modes of the power generation system 1.

Since the present invention aims to solve problems that occur in power outages, the table shows only a few operation examples of the power generation system 1 for cases where the commercial power grid 30 is operating normally. Other examples are also possible, depending on the usage of the power generation system 1 when the commercial power grid 30 is in normal operation (e.g., peak clipping and peak shifting). When the commercial power grid 30 is malfunctioning (e.g., in a power outage), the power generation system 1 supplies electric power to the autonomous load system 40 alone. Since the autonomous load system 40 is connected to the second storage battery 42 and the control device 41 at all times, the autonomous load system 40 always has electric power available for its consumption. Therefore, if the power generation system 1 is capable of supplying electric power to loads ((1) and (2) in FIG. 2), the power conversion direction in the power conversion unit 52 is from DC to AC. The power conditioner control unit 53 controls the power conversion unit 52 in such a manner that the power conversion unit 52 can output as much AC power as the power consumption of the autonomous load system 40, in other words, that the power conversion unit 52 can deliver constant voltage and frequency as required by the autonomous load system 40 (e.g., 200 V, 60 Hz).

In "(1) Charge/discharge" mode in an autonomous operation shown in FIG. 2, the first storage battery 20 can be charged/discharged, in other words, the remaining charge of the first storage battery 20 is neither too little nor too much (e.g. between 7% and 95%). The first storage battery 20 is charged and discharged in accordance with the following conditions, which takes the efficiency of the power conversion unit 52 into consideration.

The first storage battery 20 is:

neither charged nor discharged if Power Generation of Power Generation Device 10=Power Consumption of Autonomous Load System 40/Efficiency;

charged if Power Generation of Power Generation Device 10>Power Consumption of Autonomous Load System 40/Efficiency, in which case Charge=Power Generation of Power Generation Device 10−Power Consumption of Autonomous Load System 40/Efficiency; and discharged if Power Generation of Power Generation Device 10<Power Consumption of Autonomous Load System 40/Efficiency, in which case Discharge=Power Consumption of Autonomous Load System 40/Efficiency− Power Generation of Power Generation Device 10.

When the charge level increases beyond a prescribed charge level (e.g., 95% of the total capacity of the first storage battery 20) during a charging of the first storage battery 20, the charging is stopped, and the power generation system 1 enters "(2) Discharge" mode.

When there occurs a power outage, the power conditioner control unit 53 may immediately detect the power outage and stop the operation of the power conditioner.

When the remaining charge (=charge level) decreases below a prescribed discharge level (e.g., 7% of the total capacity of the first storage battery 20) during a discharging of the first storage battery 20, the discharging is stopped. When the discharging is stopped, the first storage battery 20 no longer discharges. Since Power Generation of Power Generation Device 10<Power Consumption of Autonomous Load System 40/Efficiency, the power generation system 1 is prohibited from supplying electric power to the autonomous load system 40. Consequently, the power conversion unit 52 stops its output, and the discharge switch 21 is opened, which in turn puts the power generation system 1 into "(3) Power Supply Lost" mode as will be detailed later.

In the power generation system 1, the first storage battery 20, the second storage battery 42, the power conditioner 50 are provided as distinct entities (e.g., they are procured from different manufacturers). A special interface is prepared for each independent device to control the devices separately or acquire information on the status of each device. The control device 41 instructs each device on the basis of status information, in order to perform the operation of switches described earlier (dotted lines in FIG. 1). The control device 41 may be a computer system such as a server, a workstation, or a personal computer. The operation of the control device 41 will be described later in detail.

Examples of the special interface include, but are not limited to, standard protocols such as ModBuS, CANBuS, RS-485, SunSpec, and SNMP. In some cases, interface adapters may be used together to connect these interfaces to a personal computer (not shown in FIG. 1). An example of such an adapter is one that, for example, converts ModBuS digital electric signals such that they are compatible with the Ethernet (Registered Trademark), which is used often with computers. The control device 41 communicates with the power conditioner control unit 53 and the storage battery control unit 27 via these special interfaces.

Switching Between Power Sources in Power Generation System

A description will be given of power sources in the power generation system 1. The second storage battery 42 may be, for example, a UPS (uninterruptible power supply) or like power source that provides a continuous power supply to the control device 41 even when the power grid goes off. The storage battery power source unit 26 in the first storage battery 20 receives electric power from the power distribution path 70 and the storage battery module 25. This is however a mere example. As an alternative example, the second storage battery 42 may supply electric power to the storage battery power source unit 26. The storage battery power source unit 26 sources electric power from the power distribution path 70 when the storage battery module 25 has no remaining charge and from the storage battery module 25 in a power outage.

The power-conditioner power source unit 51 needs to supply electric power to the switches and power conditioner control unit 53 in the power conditioner 50, in order to operate the power conditioner 50. If the power-conditioner power source unit 51 sources electric power from the commercial power grid 30, however, the power conditioner control unit 53 and the life lose power source and do not operate in a power outage. To prevent this from happening, the power conditioner 50, the switches, and the power conditioner control unit 53 are powered. not only by the commercial power grid 30, but also by the power generation device 10 and the first storage battery 20. For the power conditioner control unit 53 and the like to be powered by the first storage battery 20, the discharge switch 21 must be closed. Therefore, if the power generation device 10 is generating electric power in a power outage, the power-conditioner power source unit 51 may be powered by the power generation device 10. But, if the power generation device 10 is, for example, a solar cell array, the power generation device 10 generates no electric power at all at night. If the power generation device 10 is a wind power generator, the power generation device 10 generates no electric power when there is no wind. In these cases, the first storage battery 20 is ready to supply electric power. If the discharge switch 21 is open in a power outage, however, the first storage battery 20 cannot deliver electric power. The power conditioner 50 therefore does not operate in a power outage. As a result, the control device 41 becomes incapable of communicating with the power conditioner control unit 53. To overcome this situation, the control device 41, receiving electric power from the second storage battery 42, is capable of sending an instruction to the first storage battery 20 to close the discharge switch 21. As detailed here, if there occurs a power outage while the power generation device 10 is not generating electric power, the first storage battery 20 supplies electric power to the power conditioner 50, enabling again the communications between the control device 41 and the power conditioner control unit 53.

Next will be described an operation, assuming that there is an ongoing power outage, the power generation device 10 is not generating electric power, and the first storage battery 20 has discharged to such an extent that its remaining charge is below a prescribed discharge level. Because the power generation system 1 cannot supply electric power to the autonomous load system 40, the entire system needs to be shut down. As an outline of this procedure, the control device 41 operates the switches and the like in line with "(3) Power Supply Lost" mode shown in FIG. 2. This results in the autonomous load system 40 losing its power supply. Additionally, since the control device 41 is a computer system, the control device 41 needs to be shut down. Therefore, the second storage battery 42 needs to supply electric power to the control device 41 at least until the control device 41 completes its shutdown.

The shutting down of the control device 41 may include the shutting down of the OS (operating system), and the second storage battery 42 may send an OS shutdown instruction. Specifically, in response to the autonomous load system 40 losing its power supply, the second storage battery 42 starts supplying electric power to the control device 41. The remaining charge of the second storage battery 42 decreases with time. The second storage battery 42 may send an instruction to the control device 41 to shut down the OS when the remaining charge has decreased to a prescribed level.

Now, assume that the power generation device 10 resumes power generation after the power generation system 1 is shut down. For example, if the power generation device 10 is a solar cell array, this situation actually happens early morning when power generation is resumed after a daybreak. As another example, if the power generation device 10 is a wind power generator, the situation actually happens when the wind starts blowing again after a break. Because the power generation device 10 starts supplying electric power to the power-conditioner power source unit 51, the power conditioner control unit 53 controls the power conditioner 50 to start up in "(1) Charge/discharge" mode shown in FIG. 2. This resumes the supply of electric power to the autonomous load system 40. At the same time, the second storage battery 42 starts up. When the battery level of the second storage battery 42 exceeds a prescribed value, the control device 41 also starts up.

Operation of Control Device

Next will be described a non-limiting operation example of the control device 41 in reference to a flow chart in FIG. 3. First, the control device 41 starts up. In S20, it is checked whether or not the commercial power grid 30 is in a power outage. The power outage includes, for example, those situations where the power conditioner control unit 53 is experiencing, for example, an insufficient grid voltage, abnormal frequency, or grid malfunction. The process proceeds to S30 if there is an ongoing power outage and returns to S10 if the commercial power grid 30 is in normal operation (no power outage). If the control device 41 fails to communicate with the power conditioner control unit 53, for example, in S20 where the commercial power grid 30 is checked, the failure could be an indication that the power conditioner 50 is being fed with no electric power as mentioned above. This problem is addressed, for example, by sending an instruction to the first storage battery 20 in S20 to close the discharge switch 21, which in turn starts power supply to the power conditioner 50. This instruction may be sent not in S20, but in S10 as an alternative example.

As an alternative, the control device 41 may in S10 perform a non-power-outage joint operation and, for example, operate in one of the operation modes under the "normal" grid status shown in FIG. 2. The latter operation is out of the technical scope of the present invention. As another alternative, the control device 41 may operate in plurality mode in S10, and the control device 41 and the commercial power grid may switch between the operation modes, for example, according to a schedule. In a normal operation, S10 and S20 are repeated regularly every few seconds).

It is checked in S30 whether or not the first storage battery 20 is dischargeable. If the first storage battery 20 is dischargeable, the process proceeds to S40; if not, the process proceeds to S140. The check in S30 is done based on information received from the storage battery control unit 27. For example, if the remaining charge of the storage battery module 25 is below a prescribed discharge level (e.g. 7%) or if the storage battery module 25 can discharge zero current, the control device 41 receives information indicating a non-dischargeable status from the storage battery control unit 27.

In S40, the first storage battery 20 is discharged by closing the discharge switch 21 of the first storage battery 20 and closing the switch 61. The closure of the switch 61 is intended to curb the inrush current described earlier. The process then proceeds to S50. S40 may be skipped if the discharge switch 21 and the switch 61 are already closed.

If the first storage battery 20 requires an additional process to be executed before checking the remaining charge of the first storage battery 20 in S30, the additional process may be executed also in S30.

Charge substeps, which will e described later in detail, are performed in S50, before the process proceeds to S90.

Figure 4:
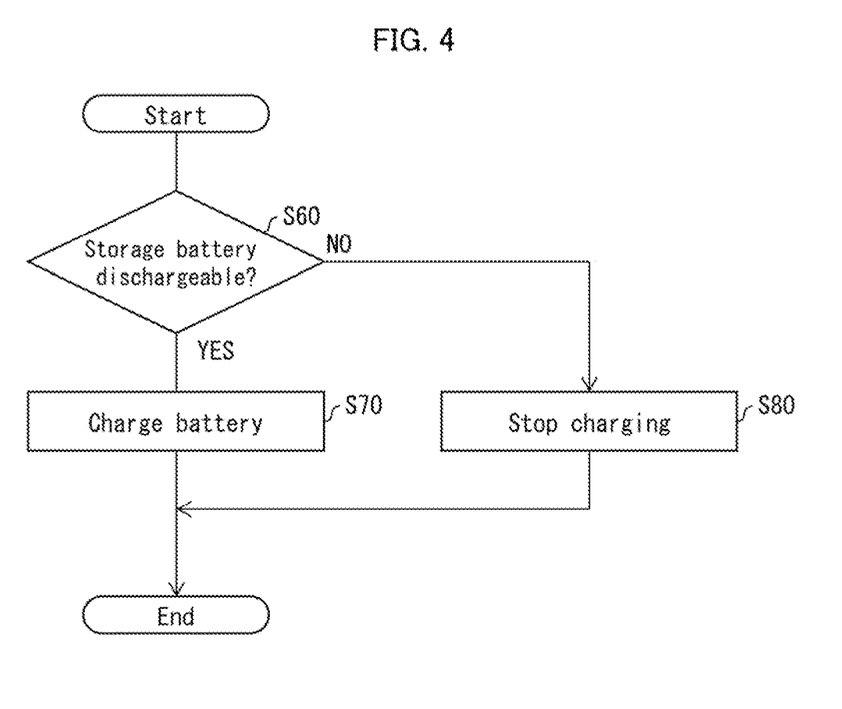
FIG. 4 is a flow chart depicting charge control substeps executed by the control device.

FIG. 4 is a flow chart depicting S50 in detail. In S60, it is checked whether or not the first storage battery 20 is chargeable. If it is chargeable, the process proceeds to S70; if not, the process proceeds to S80. This check is done based on information received from the storage battery control unit 27, for example, as in the following.

If the remaining charge of the first storage battery 20 is below a prescribed charge level (e.g. 95%), the first storage battery 20 is chargeable.

If the remaining charge of the first storage battery 20 exceeds the prescribed charge level (e.g. 95%) and is less than or equal to 100%, and the charge switch 23 is closed, the first storage battery 20 is chargeable.

If there is no electric current to charge the first storage battery 20 or if the first storage battery 20 has a charge level of 100%, the first storage battery 20 is not chargeable.

The charge switch 23 of the first storage battery 20 is then closed in S70 so that the first storage battery 20 can be charged, which ends the process shown in FIG. 4. This state is an equivalent of "(1) Charge/discharge" mode in FIG. 2. If the charge switch 23 is already closed, S70 may be skipped. If an additional process needs to be executed before the charge switch 23 is closed due to the condition of the first storage battery 20, the additional process may be executed. The additional process may, for example, include a temporary suspension of the operation of the power conversion unit 52 and a temporary opening of, for example, the switches 61, 72, and 73.

In S80, the charge switch 23 of the first storage battery 20 is opened to stop the charging of the first storage battery 20, which ends the process shown in FIG. 4. This state is an equivalent of "(2) Discharge" mode in FIG. 2. If the charge switch 23 is already opened, S80 may be skipped.

In a more practical example, if the power generation device 10 is generating electric power and the first storage battery 20 is charging, the first storage battery 20 is stopped from charging by opening the charge switch 23 when the charge level of the first storage battery 20 has reached 100%. Thereafter, when the power generation of the power generation device 10 decreases below the power consumption of the autonomous load system 40 (e.g., when it gets cloudy if the power generation device 10 is a solar cell array or when the wind becomes insufficient if the power generation device 10 is a wind power generator), the first storage battery 20 starts discharging. When the charge level of the first storage battery 20 has decreased to 95% or below, the charge switch 23 is closed, but the first storage battery 20 still continues to discharge until the charge level decreases to 70%. In this situation, if the power generation of the power generation device 10 increases again and exceeds the power consumption of the autonomous load system 40, the first storage battery 20 starts charging with this electric power difference.

In S90, the power conversion unit 52 autonomously operates by converting DC power to AC power. Then, the process proceeds to S110.

In S110, it is checked whether or not the commercial power grid 30 has recovered. "Recovered" here refers, for example, to a response from the power conditioner control unit 53 to the commercial power grid 30 that everything, including the voltage and frequency of the grid, is back to normal. In this situation, if the commercial power grid 30 is normal, the process proceeds to S10. If the power outage is still continuing, the process proceeds to S120. If there are checks and other procedures that need to be done upon the recovery of the commercial power grid 30 (e.g., a worker in a facility where the power generation system 1 is installed needs to confirm the recovery of the commercial power grid 30) before the power conditioner 50 is allowed to resume a joint operation, these checks and other procedures are done in S10.

Checks similar to those in S30 are performed in S120. If the first storage battery 20 is dischargeable, the process proceeds to S130; if not, the process proceeds to S140.

In S130, the substeps shown in FIG. 4 are performed. The process then returns to S110.

Figure 5:
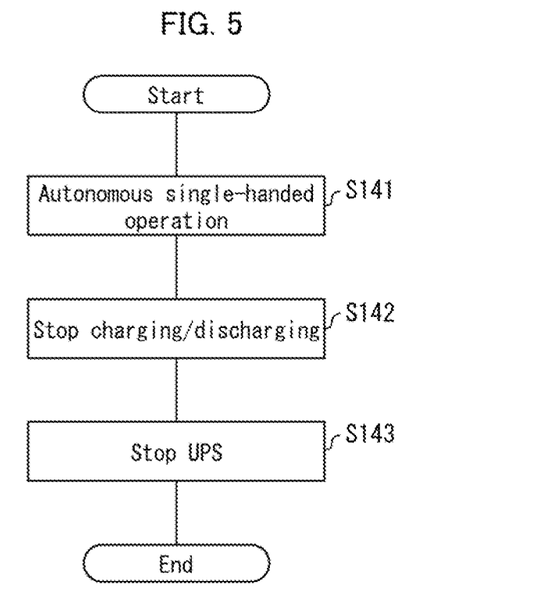
FIG. 5 is a flow chart depicting an example set of substeps followed by the control device in a shutdown.

The control device 41, in S140, performs the shutdown process described earlier if the power generation device 10 is not generating sufficient power and the first storage battery 20 can no longer discharge. An example is shown in FIG. 5. In this example, the second storage battery 42 (UPS) is assumed to have an interface through which the second storage battery 42 receives a shutdown instruction.

The power conditioner 50 autonomously and single-handedly operates in S141 shown in FIG. 5. Nevertheless, the power conditioner 50, at this stage, is powered only by the first storage battery 20 (via the power distribution path 70). Therefore, the switches 72 and 73 of the power conditioner 50 are opened so that the power conditioner 50 can be in an autonomous single-handed operation, without operating any switches of the first storage battery 20. The process then proceeds to S142.

In S142, the discharge switches 21 and 23 of the first storage battery 20 are opened so that the first storage battery 20 can no longer charge/discharge. Power supply to the power conditioner 50 is stopped at this stage. The process then proceeds to S143 where the control device 41 instructs the second storage battery 42 (UPS) to stop operation (shut down) after some amount of time has elapsed. This amount of time may be, for example, longer than the time the control device 41 takes to shut down. Thereafter, the control device 41 shuts down, an instruction for which may be sent from the second storage battery 42 (UPS).

The prescribed charge level and the prescribed discharge level do not need to have a fixed value. These levels may be varied depending on conditions such as a history of variations in the remaining charge and/or a history of the remaining charge at the time of startups and shutdowns of the power generation system 1.

Second Embodiment

In a second embodiment, the second storage battery 42 (UPS) does not receive a shutdown instruction. When the power grid goes off, the UPS can send a shutdown notice to the control device 41.

Figure 6:
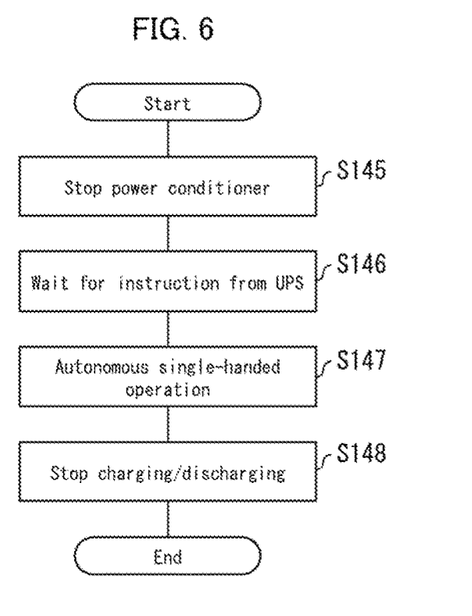
FIG. 6 is a flow chart depicting an example set of substeps followed by a control device in a shutdown, in a power generation system in accordance with a second embodiment.

The current embodiment differs from the first embodiment in that S140 is implemented through the substeps shown in FIG. 6 instead of the substeps shown in FIG. 5. First, the power conditioner 50 is stopped in S145, after which the process proceeds to S146. At this stage, the power conditioner 50 has stopped the output to the autonomous load system 40. Upon recognizing this, the UPS (second storage battery 42) starts supplying electric power to the control device 41. If the power grid goes off, the UPS enters shutdown mode after a period of time T1 has elapsed. A period of time T2 after that, the UPS gives a shutdown notice to the control device 41 as a part of the shutdown mode. Then, a period of time T3 after that, the UPS gives a shutdown instruction to the OS of the control device 41. A period of time T4 after that, the UPS shuts down itself. In the current context, the periods of time T1, T2, T3, and T4 may be set to different values. As an alternative example, all of them may be set to 1 minute.

The control device 41, in S146, waits for a shutdown notice from the UPS, and upon arrival of such a notice, proceeds to execute S147. S147 is the same substep as S141. After S147, the process proceeds to S148. S148 is the same substep as S142. After S148, the process ends. At this stage, the OS of the control device 41 waits for an OS shutdown instruction from the UPS, and upon arrival of such an instruction, shuts down itself.

Third Embodiment

Figure 7:
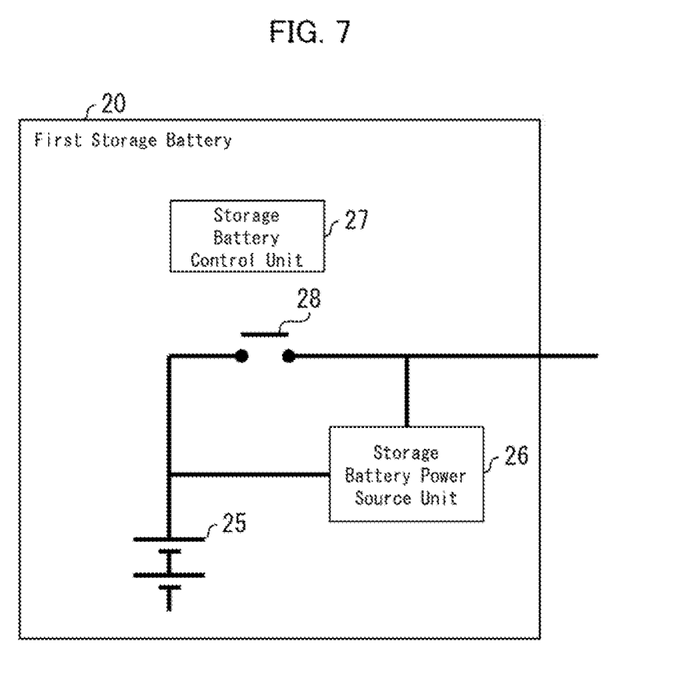
FIG. 7 is a block diagram of a configuration showing how a power generation system in accordance with a third embodiment differs from the power generation system shown in FIG. 1.

FIG. 7 is a block diagram of a configuration showing how a power generation system 1 in accordance with a third embodiment differs from the power generation system 1 shown in FIG. 1. In this example, differences are found where the charge switch 23, the charge diode 24, the discharge switch 21, and the discharge diode 22 in the first storage battery 20 are replaced by a combined charge/discharge switch 28. In other words, FIG. 1 shows separate charge and discharge switches, whereas FIG. 7 shows a single switch used for both charging and discharging and no switch used solely for charging or solely for discharging.

Figure 8:
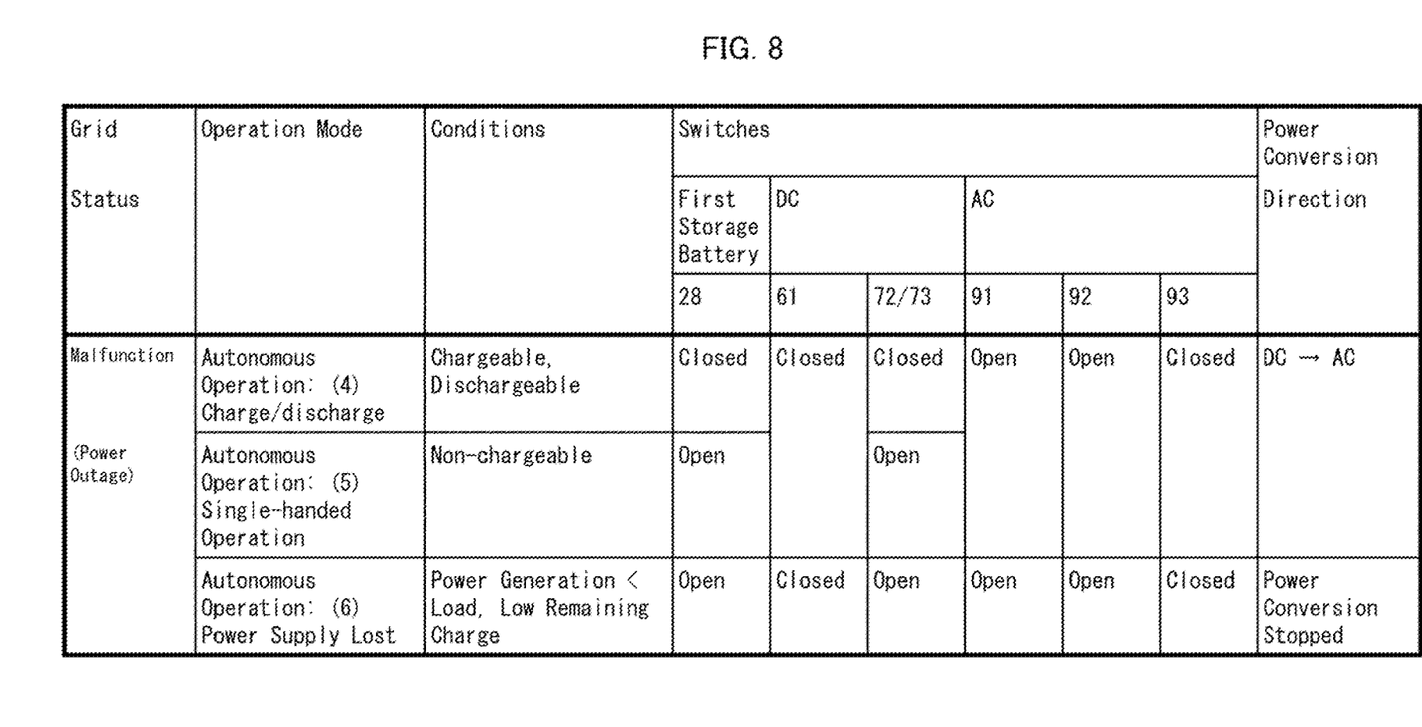
FIG. 8 is a diagram showing relationships that differ from those shown in FIG. 2.

FIG. 8 is a diagram showing relationships that differ from those shown in FIG. 2. Only differences in autonomous operation (power outage) will be discussed here. To give an overview, the discharge switch 21 and the charge switch 23 of the first storage battery 20 are replaced by the combined charge/discharge switch 28. "(4) Charge/discharge" mode and "(6) Power Supply Lost" mode shown in FIG. 8 are basically the same as "(1) Charge/discharge" mode and "(3) Power Supply Lost" mode shown in FIG. 2 respectively. If the first storage battery 20 cannot be charged in FIG. 1, the first storage battery 20 can be put into "(2) Discharge" only mode shown in FIG. 2 by opening only the charge switch 23. In the configuration in FIG. 7, however, the first storage battery 20 cannot only discharge for the following reason. Since the combined charge/discharge switch 28 alone is used for both charging and discharging, if the first storage battery 20 cannot be charged, the combined charge/discharge switch 28 must inevitably be opened. Therefore, in FIG. 8, when the first storage battery 20 cannot be charged, the first storage battery 20 cannot be discharged. Conversely, when the first storage battery 20 cannot be discharged, the first storage battery 20 cannot be charged. It therefore follows that the first storage battery 20 operates in "(5) Single-handed Operation" mode.

In "(5) Single-handed Operation" mode, only the power generated by the power generation device 10 is outputted to the autonomous load system 40. In "(5) Single-handed Operation" mode, the switches 72 and 73 may be opened beforehand, and upon the commercial power grid 30 returning to a normal state, be closed.

Figure 3:
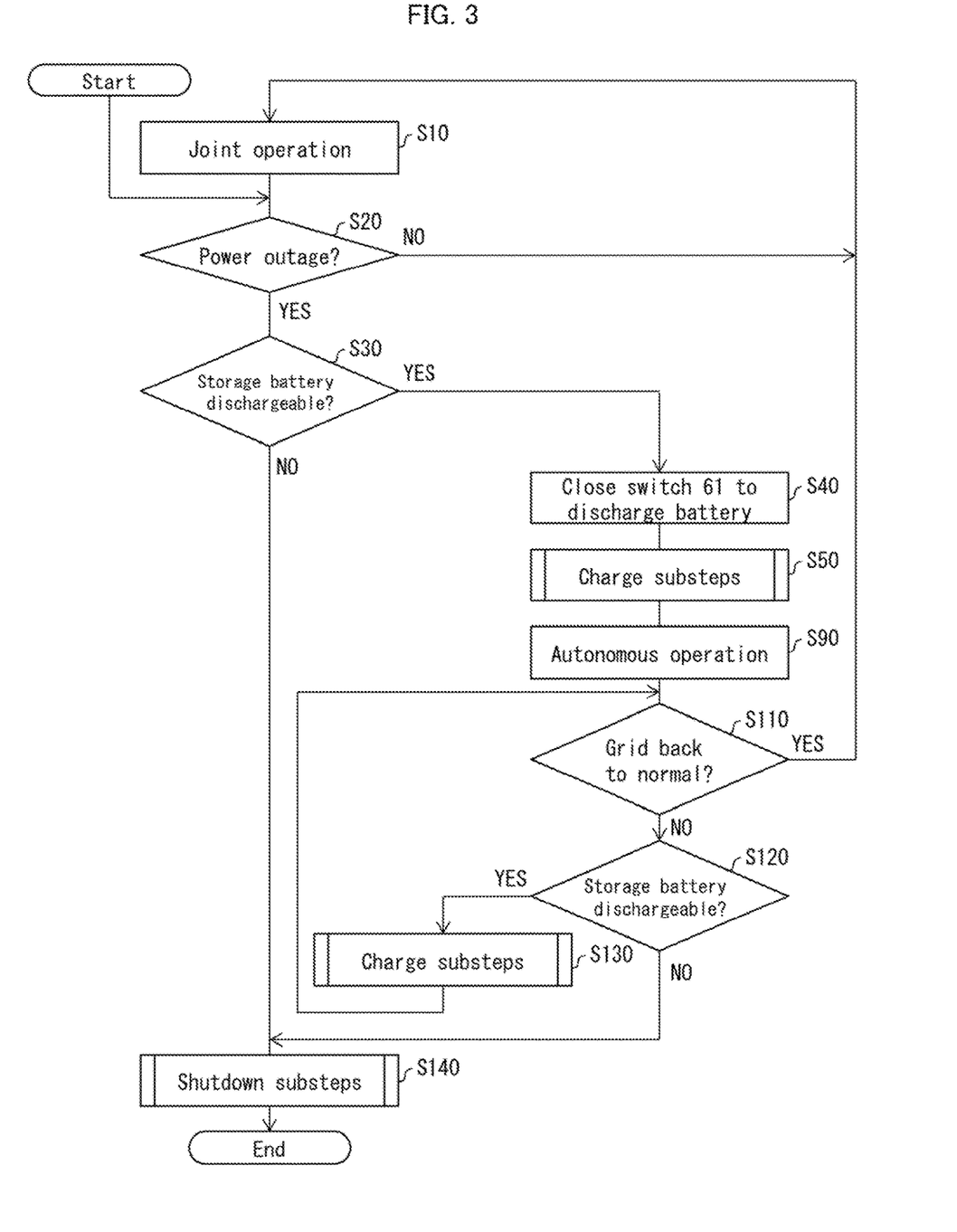
FIG. 3 is a flow chart depicting control steps executed by a control device.
Figure 9:
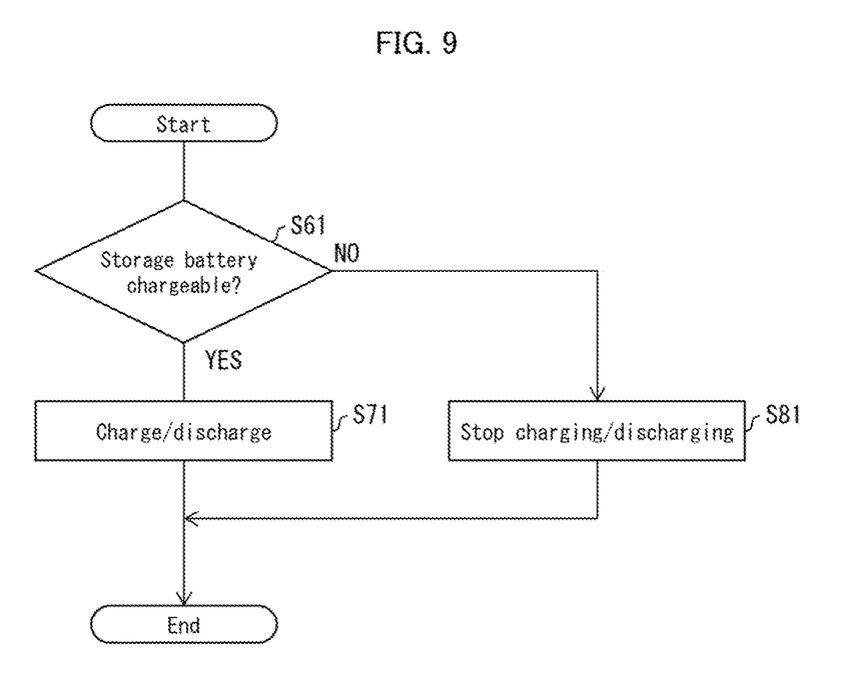
FIG. 9 is a flow chart depicting charge control substeps replacing S40, S50, and S130 in FIG. 3.

A flow chart for the current embodiment is obtained by substituting a process shown in FIG. 9 for each step of S40, S50, S130 in FIG. 3. In S61 in FIG. 9, which is basically the same substep as S60 in FIG. 4, if the first storage battery 20 is chargeable, the process proceeds to S71; if not, the process proceeds to S81.

The combined charge/discharge switch 28 of the first storage battery 20 is then closed in S71 so that the first storage battery 20 can be charged/discharged, which ends the process shown in FIG. 9. That is "(4) Charge/discharge" mode shown in FIG. 8. If the combined charge/discharge switch 28 is already closed, S71 may be skipped. As mentioned earlier, if the combined charge/discharge switch 28 is closed with only the power generation device 10 being connected to the power distribution path 80, an inrush current may flow to the first storage battery 20, potentially destructing the first storage battery 20. Therefore, switches are operated in the following, suitable sequence: the power conversion unit 52 is stopped, the switch 61 is opened, the combined charge/discharge switch 28 is then closed, the switch 72 is closed, the switch 73 is closed, and a switch 71 is closed. After that, the power conversion unit 52 autonomously resumes operation.

The combined charge/discharge switch 28 of the first storage battery 20 is then opened in S81 in order to stop the charging/discharging of the first storage battery 20, which ends the process shown in FIG. 9. This state is an equivalent of "(5) Single-handed Operation" shown in FIG. 8. If the combined charge/discharge switch 28 is already opened, S81 may be skipped.

The configuration shown in FIG. 1 executes S142 shown in FIG. 5 by opening the discharge switch 21 and the charge switch 23 of the first storage battery 20 to stop charging/discharging. Meanwhile, the configuration shown in FIG. 7 executes S142 by opening the combined charge/discharge switch 28 to stop charging/discharging.

Software Implementation

The control device 41 may be implemented using logic circuits (hardware) fabricated, for example, in the form of an integrated circuit (IC chip) or by software executed by a CPU (central processing unit).

In the latter case, the control device 41 includes among others a CPU that executes instructions from programs, or software, for implementing various functions, a ROM (read-only memory) or like storage device (referred collectively to as a "storage medium") containing the programs and various data in a computer-readable (or CPU-readable) format, and a RAM (random access memory) for loading the programs. The computer (or CPU) retrieves and executes the programs contained in the storage medium, thereby achieving the object of the present invention. The storage medium may be a "non-transient, tangible medium" such as a tape, a disc, a card, a semiconductor memory, or programmable logic circuitry. The programs may be fed to the computer via any transmission medium (e.g., over a communications network or by broadcasting waves) capable of transmitting the programs. The present invention, in an aspect thereof, encompasses data signals on a carrier wave that are generated during electronic transmission of the programs.

Summation

The present invention, in aspect 1 thereof, is directed to a power generation system (1) to be connected to a power grid (30) and an autonomous load system (40), the power generation system (1) including: a power generation device (10); a first power storage device (20); a power conditioner (50); a second power storage device (42); and a control device (41), wherein: the power conditioner (50) has a first AC power distribution path (90a) and a second AC power distribution path (90b) to which the power grid (30) and the autonomous load system (40) are to be connected respectively; the power conditioner (50) has a first DC power distribution path (60) and a second. DC power distribution path (70) to which the power generation device (1) and the first power storage device (20) are connected respectively; the first DC power distribution path 60) can be electrically connected to the second DC power distribution path (70); the second power storage device (42) is to be connected to the autonomous load system (40); the control device (41) is connected to the second power storage device (42); electric power can be supplied to the power conditioner (50) from the power grid (30), the power generation device (10), and the first power storage device (20); and the control device (41) can communicate with the first power storage device (20), the power conditioner (50), and the second power storage device (42).

This arrangement enables the electric power required by the power conditioner for its operation to be selectively supplied by the power grid, the power generation device, or the first power storage device. In particular, when the power grid goes off, the control device receives electric power from the second power storage device and continues its control operation to maintain the state in which the power conditioner can be fed with electric power. Hence, the arrangement can provide a power generation system that can, even when the power grid goes off, supply electric power at least, to the power conditioner.

In aspect 2 of the present invention, the power generation system (1) in accordance with aspect 1 thereof may be configured such that the first power storage device (20) including a charge switch (23) for charging and a discharge switch (1) for discharging, wherein the control device (41), upon receiving a malfunction status of the power grid (30) from the power conditioner (50) and a dischargeable status from the first power storage device (20), instructs the first power storage device (20) to close the discharge switch (21) and the power conditioner (50) to operate autonomously This arrangement can achieve the same effects in a structure including a combined charge/discharge switch that doubles as a charge switch and a discharge switch as those achieved in aspect 1.

In aspect 3 of the present invention, the power generation system (1) in accordance with aspect 1 thereof may be configured so as to further include a combined charge/discharge switch (28) for charging and discharging the first power storage device (20), wherein the control device (41), upon receiving a malfunction status of the power grid (30) from the power conditioner (50), a dischargeable status from the first power storage device (20), and a chargeable status from the first power storage device, instructs the first power storage device (20) to close the combined charge/discharge switch (28) and the power conditioner (50) to operate autonomously and, upon receiving a non-chargeable status from the first power storage device (20), instructs the first power storage device (20) to open the combined charge/discharge switch (28).

In aspect 4 of the present invention, the power generation system (1) in accordance with aspect 2 thereof may be configured such that the control device (41), upon receiving a chargeable status from the first power storage device (20), instructs the first power storage device (20) to close the charge switch (23) and, upon receiving a non-chargeable status from the first power storage device (20), instructs the first power storage device (20) to open the charge switch (23).

If the power generation device is generating more electric power than required by the autonomous load system when the power conditioner is operating autonomously in a grid malfunction observed in aspect 2, this arrangement can store the excess electric power in the first power storage device.

In aspect 5 of the present invention, the power generation system (1) in accordance with aspect 2 or 3 thereof may be configured such that the control device (41), upon receiving a normal status of the power grid (30) from the power conditioner (50), instructs the power conditioner (50) to switch to joint operation.

This arrangement enables a normal joint operation to started when the power grid is back to normal from a malfunction.

In aspect 6 of the present invention, the power generation system (1) in accordance with aspect 2 thereof may be configured such that the control device (41), upon failing to communicate with the power conditioner (50), instructs the first power storage device (20) to close the discharge switch (21), According to this arrangement, when the power grid is malfunctioning, the device may fail to communicate with the power conditioner in the following cases: when, for example, the power conditioner has broken and when the power generation device generates no electric power and the power conditioner therefore has lost its power source. In the latter case, by closing the discharge switch, the power conditioner can start up on the electric power supplied by the first power storage device. The power conditioner can hence learn of the malfunction of the power grid and inform the control device of the malfunction. The power conditioner can therefore receive an autonomous operation instruction from the control device.

In aspect 7 of the present invention, the power generation system (1) in accordance with aspect 3 thereof may be configured such that the control device (41), upon failing to communicate with the power conditioner (50), instructs the first power storage device (20) to close the combined charge/discharge switch (28).

This arrangement can achieve the same effects in a structure including a combined charge/discharge switch in the first power storage device as those achieved in aspect 6.

In aspect 8 of the present invention, the power generation system (1) in accordance with aspect 2 thereof may be configured such that the control device (41), upon receiving a non-dischargeable status from the first power storage device (20), instructs the power conditioner (50) to switch to single-handed operation, the first power storage device (20) to open the charge switch (23) and the discharge switch (21), and the second power storage device (42) to shut down.

If, for example, the remaining charge of the first power storage device has decreased to a non-dischargeable level in a grid malfunction observed in aspect 2, this arrangement temporarily stops the operation of the power conditioner, switches the power conditioner to single-handed operation, and opens the charge switch and the discharge switch. Hence, when the power generation device has started or resumed generating electric power, the power conditioner can start up on the generated electric power.

As the operation of the power conditioner is stopped, no electric power is supplied from the power conditioner to the second power storage device. In this loss of power source, the control device performs a shutdown operation. In respective to instructions from the control device, the second power storage device performs a shutdown operation.

In aspect 9 of the present invention, the power generation system (1) in accordance with aspect 3 thereof may be configured such that the control device (41), upon receiving a non-dischargeable status from the first power storage device (20), instructs the power conditioner (50) to stop operation and, in response to receiving information from the second power storage device (42) that the second power storage device (42) is about to shut down, instructs the power conditioner (50) to switch to single-handed operation and the first power storage device (20) to open the combined charge/discharge switch (28).

This arrangement can achieve the same effects in a structure including a combined charge/discharge switch in the first power storage device as those achieved in aspect 8.

In aspect 10 of the present invention, the power generation system (1) in accordance with aspect 2 thereof, may be configured such that the control device (41), upon receiving a non-dischargeable status from the first power storage device (20), instructs the power conditioner (50) to stop operation and, in response to receiving information from the second power storage device (42) that the second power storage device (42) is about to shut down, instructs the power conditioner (50) to switch to single-handed operation and the first power storage device (20) to open the charge switch (23) and the discharge switch (21).

This arrangement can achieve the same effects as those achieved in aspect 8. In the arrangement, however, as the operation of the power conditioner is stopped, no electric power is supplied from the power conditioner to the second power storage device. In this situation, the second power storage device performs a shutdown operation. The second power storage device sends information to the control device that the second power storage device is about to shut down. The control device, in response to receiving that information, controls the power conditioner to switch to single-handed operation. After a process is performed so as to open the charge switch and the discharge switch, the second power storage device shuts down itself.

In aspect 11 of the present invention, the power generation system (1) in accordance with aspect 3 thereof, may be configured such that the control device (41), upon receiving a non-dischargeable status from the first power storage device (20), instructs the power conditioner (50) to stop operation and, in response to receiving information from the second power storage device (42) that the second power storage device (42) is about to shut down, instructs the power conditioner (50) to switch to single-handed operation and the first power storage device (20) to open the combined charge/discharge switch (28).

This arrangement can achieve the same effects in a structure including a combined charge/discharge switch in the first power storage device as those achieved in aspect 10.

The present invention, in aspect 12 thereof, is directed to a power control device (41) for a power conditioner (50) having a DC end where a power generation device (10) and a first power storage device (20) are connected in parallel and an AC end where a power grid (30) and an autonomous load system (40) are to be connected in parallel, wherein: the first power storage device (20) is connected to the power conditioner (50) via a power distribution path (70) that includes a switching element (72, 73); the autonomous load system (40) includes a second power storage device (42) that supplies electric power to the power control device (41); and the power control device (41), upon the power conditioner (50) failing to receive any electric power at all from the power grid (30), the power generation device (10), and the first power storage device (20), causes the second power storage device (42) to discharge and the switching element (72, 73) to close so that the first power storage device (20) supplies electric power to the power conditioner (50).

According to this arrangement, when the power conditioner does not receive any electric power at all from the power grid, the power generation device, and the first power storage device, in other words, when these power sources go off, the power control device can perform required control operation by relying on the electric power supplied by the second power storage device. "Required control operation" includes at least the control to close the switching element that electrically connects/disconnects the first power storage device and the power conditioner. The power control device, sufficiently powered to control the switching element to close, enables the power conditioner to be fed with electric power by the first power storage device and operate autonomously.

The present invention, in aspect 13 thereof, is directed to a power conditioner (50) including: a first AC power distribution path (90*a*) to be connected to a power grid (30); a second AC power distribution path (90*b*) connected to a second power storage device (42) and to be connected to an autonomous load system (40), the second AC power distribution path (90*b*) branching off the first AC power distribution path (90*a*); a first DC power distribution path (60) connected to a power generation device (10); a second DC power distribution path (70) connected to a first power storage device (20), the second DC power distribution path (70) branching off the first DC power distribution path (60); a first switching element (91) configured to open/close the first AC power distribution path (90*a*); a second switching element (93) configured to open/close the second AC power distribution path (90*b*); a third switching element (61) configured to open/close the first DC power distribution path (60); a fourth switching element (73) configured to open/close the second DC power distribution path (70); and a control device (41) configured to control the first to fourth switching elements to open/close, wherein by controlling the first to fourth switching elements (73) to open/close, the control device (41) switches between (a) a state where the first power storage device (20) is chargeable/dischargeable when the power grid (30) is malfunctioning, (b) an operation state where the first power storage device (20) is available as a power source when the power grid (30) is malfunctioning, and (c) an out-of-operation state where if the power generation device (10) is generating less electric power than required by the autonomous load system (40) and the first power storage device is non-dischargeable when the power grid (30) is malfunctioning, the control device stops operation by relying on electric power supplied by the second power storage device; and if the power generation device (10) is generating more electric power than required by the autonomous load system (40) when the power grid (30) is malfunctioning, the power generated by the power generation device (10) is made available as a power source.

This arrangement provides a power conditioner that, when the power grid is in normal operation, is capable of autonomous operation on power supply from a first power storage device as long as the first power storage device is dischargeable in a power outage even if the first power storage device and the power conditioner are provided as two independent devices. If the first power storage device is non-dischargeable in a power outage, the power conditioner switches to an out-of-operation state. In this situation, the control device is fed with electric power by the second power storage device and therefore may through its control operation prepare the power conditioner to start up by relying on power supply from the power generation device when the power generation device starts generating more electric power than required by the autonomous load system.

A power control device may be structured as in the following.

A power control device configured to control a power conditioner including:

a power converter configured to convert DC power to AC power and vice versa;

a first AC power distribution path connected to an AC end of the power converter and to be connected to a power grid;

a second AC power distribution path connected to the AC end of the power converter and to be connected to an autonomous load system, the second AC power distribution path branching off the first AC power distribution path;

a first DC power distribution path connected to a DC end of the power converter and a power generation device;

a second DC power distribution path connected to the DC end of the power converter and a first power storage device, the second DC power distribution path branching off the first DC power distribution path;

a first switching element configured to open/close the first AC power distribution path;

a second switching element configured to open/close the second AC power distribution path;

a third switching element configured to open/close the first DC power distribution path; and a fourth switching element configured to open/close the second DC power distribution path;

wherein by controlling the first to fourth switching elements to open/close, the power control device switches between (a) an operation state where the power generation device and the power grid are available as power sources, (b) an operation state where the first power storage device and the power grid are available as power sources, (c) a state where the power grid supplies electric power to the first power storage device and the autonomous load system, (d) a state where the first power storage device is chargeable/dischargeable when the grid is malfunctioning, (e) an operation state where the first power storage device is available as a power source when the grid is malfunctioning, and (f) an out-of-operation state where if the power generation device is generating less electric power than required by the autonomous load system and the first power storage device is non-dischargeable when the grid is malfunctioning, the power control device stops operation; and if the power generation device is generating more electric power than required by the autonomous load system when the grid is malfunctioning, the power generated by the power generation device is made available as a power source.

The present invention, in aspect 14 thereof, is directed to a power control method executed by a power control device (41) for a power conditioner (50) having a DC end where a power generation device (10) and a first power storage device (20) are connected in parallel and an AC end where a power grid (30) and an autonomous load system (40) are to be connected in parallel, wherein: the first power storage device (20) is connected to the power conditioner (50) via a power distribution path (70) that includes a switching element (72, 73); the autonomous load system (40) includes a second power storage device (42) that supplies electric power to the power control device (41); and the power control device (41), upon the power conditioner (50) failing to receive any electric power at all from the power grid (30), the power generation device (10), and the first power storage device (20), causes the second power storage device (42) to discharge and the switching element (72, 73) to close so that the first power storage device (20) supplies electric power to the power conditioner (50).

This method can achieve the same functions and effects as those achieved in aspect 12.

The present invention, in aspect 15 thereof, is directed to a power control program causing a computer to function as the power control device according to aspect 12. The present invention encompasses in its scope such a program and a computer-readable storage medium containing the program.

The present invention is not limited to the description of the embodiments above and may be altered within the scope of the claims. Embodiments based on a proper combination of technical means disclosed in different embodiments are encompassed in the technical scope of the present invention. Furthermore, a new technological feature may be created by combining different technological means disclosed in the embodiments.

REFERENCE SIGNS LIST

1 Power Generation System
10 Power Generation Device
20 First Storage Battery (First Power Storage Device)
21 Discharge Switch
23 Charge Switch
28 Combined Charge/discharge Switch
30 Commercial Power Grid (Power Grid)
40 Autonomous Load System
41 Control Device (Power Control Device)
42 Second Storage Battery (Second Power Storage Device)
50 Power Conditioner
60 Power Distribution Path (First DC Power Distribution Path)
61 Switch (Third Switching Element)
70 Power Distribution Path (Second DC Power Distribution Path)
72 Switch (Switching Element)
73 Switch (Switching Element, Fourth Switching Element)
90a Power Distribution Path (First AC Power Distribution Path)
90b Power Distribution Path (Second AC Power Distribution Path)
91 Switch (First Switching Element)
93 Switch (Second Switching Element)

The invention claimed is:

1. A power generation system to be connected to a power grid and an autonomous load system, said power generation system comprising: a power generation device; a first power storage device; a power conditioner; a second power storage device; and a control device, wherein:
the power conditioner has a first AC power distribution path and a second AC power distribution path to which the power grid and the autonomous load system are to be connected respectively;
the power conditioner has a first DC power distribution path and a second DC power distribution path to which the power generation device and the first power storage device are connected respectively;
the first DC power distribution path can be electrically connected to the second DC power distribution path;
the second power storage device is to be connected to the autonomous load system;
the control device is connected to the second power storage device;
electric power can be supplied to the power conditioner from the power grid, the power generation device, and the first power storage device; and
the control device can communicate with the first power storage device, the power conditioner, and the second power storage device.

2. The power generation system according to claim 1, the first power storage device including a charge switch for charging and a discharge switch for discharging, wherein the control device, upon receiving a malfunction status of the power grid from the power conditioner and a dischargeable status from the first power storage device, instructs the first power storage device to close the discharge switch and the power conditioner to operate autonomously.

3. The power generation system according to claim 1, further comprising a combined charge/discharge switch for charging and discharging the first power storage device, wherein the control device, upon receiving a malfunction status of the power grid from the power conditioner, a dischargeable status from the first power storage device, and a chargeable status from the first power storage device, instructs the first power storage device to close the combined charge/discharge switch and the power conditioner to operate autonomously and, upon receiving a non-chargeable status from the first power storage device, instructs the first power storage device to open the combined charge/discharge switch.

4. The power generation system according to claim 2, wherein the control device, upon receiving a chargeable status from the first power storage device, instructs the first power storage device to close the charge switch and, upon receiving a non-chargeable status from the first power storage device, instructs the first power storage device to open the charge switch.

5. The power generation system according to claim, wherein the control device, upon receiving a normal status of the power grid from the power conditioner, instructs the power conditioner to switch to joint operation.

6. The power generation system according to claim 2, wherein the control device, upon failing to communicate with the power conditioner, instructs the first power storage device to close the discharge switch.

7. The power generation system according to claim 3, wherein the control device, upon failing to communicate with the power conditioner, instructs the first power storage device to close the combined charge/discharge switch.

8. The power generation system according to claim 2, wherein the control device, upon receiving a non-dischargeable status from the first power storage device, instructs the power conditioner to switch to single-handed operation, the first power storage device to open the charge switch and the discharge switch, and the second power storage device to shut down.

9. The power generation system according to claim 3, wherein the control device, upon receiving a non-dischargeable status from the first power storage device, instructs the power conditioner to switch to single-handed operation, the first power storage device to open the combined charge/discharge switch, and the second power storage device to shut down.

10. The power generation system according to claim 2, wherein the control device, upon receiving a non-dischargeable status from the first power storage device, instructs the power conditioner to stop operation and, in response to receiving information from the second power storage device that the second power storage device is about to shut down, instructs the power conditioner to switch to single-handed operation and the first power storage device to open the charge switch and the discharge switch.

11. The power generation system according to claim 3, wherein the control device, upon receiving a non-dischargeable status from the first power storage device, instructs the power conditioner to stop operation and, in response to receiving information from the second power storage device that the second power storage device is about to shut down, instructs the power conditioner to switch to single-handed operation and the first power storage device to open the combined charge/discharge switch.

12. A power control device for a power conditioner having a DC end where a power generation device and a first power storage device are connected in parallel and an AC end where a power grid and an autonomous load system are to be connected in parallel, wherein:
   the first power storage device is connected to the power conditioner via a power distribution path that includes a switching element;
   the autonomous load system includes a second power storage device that supplies electric power to the power control device; and
   the power control device, upon the power conditioner failing to receive any electric power at all from the power grid, the power generation device, and the first power storage device, causes the second power storage device to discharge and the switching element to close so that the first power storage device supplies electric power to the power conditioner.

13. A power conditioner comprising:
   a first AC power distribution path to be connected to a power grid;
   a second AC power distribution path connected to a second power storage device and to be connected to an autonomous load system, the second AC power distribution path branching off the first AC power distribution path;
   a first DC power distribution path connected to a power generation device;
   a second DC power distribution path connected to a first power storage device, the second DC power distribution path branching off the first DC power distribution path;
   a first switching element configured to open/close the first AC power distribution path;
   a second switching element configured to open/close the second AC power distribution path;
   a third switching element configured to open/close the first DC power distribution path;
   a fourth switching element configured to open/close the second DC power distribution path; and
   a control device configured to control the first to fourth switching elements to open/close,
   wherein by controlling the first to fourth switching elements to open/close, the control device switches between (a) a state where the first power storage device is chargeable/dischargeable when the power grid is malfunctioning, (b) an operation state where the first power storage device is available as a power source when the power grid is malfunctioning, and (c) an out-of-operation state where if the power generation device is generating less electric power than required by the autonomous load system and the first power storage device is non-dischargeable when the power grid is malfunctioning, the control device stops operation by relying on electric power supplied by the second power storage device; and if the power generation device is generating more electric power than required by the autonomous load system when the power grid is malfunctioning, the power generated by the power generation device is made available as a power source.

* * * * *